(12) United States Patent
Kobayashi

(10) Patent No.: US 10,602,085 B2
(45) Date of Patent: Mar. 24, 2020

(54) IMAGING DEVICE, IMAGING SYSTEM, AND MOVING BODY HAVING PIXELS WITH A CONNECTION TRANSISTOR

(71) Applicant: CANON KABUSHIKI KAISHA, Tokyo (JP)

(72) Inventor: Hideo Kobayashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/901,279

(22) Filed: Feb. 21, 2018

(65) Prior Publication Data
US 2018/0249099 A1 Aug. 30, 2018

(30) Foreign Application Priority Data
Feb. 22, 2017 (JP) .................................. 2017-031426

(51) Int. Cl.
*H04N 5/347* (2011.01)
*H04N 5/378* (2011.01)
*H04N 5/3745* (2011.01)
*H04N 5/369* (2011.01)

(52) U.S. Cl.
CPC ............. *H04N 5/347* (2013.01); *H04N 5/378* (2013.01); *H04N 5/3745* (2013.01)

(58) Field of Classification Search
CPC .............................. H04N 5/347; H04N 5/3745
See application file for complete search history.

(56) References Cited

U.S. PATENT DOCUMENTS

2016/0381311 A1* 12/2016 Guo ....................... H04N 5/369
348/308
2017/0201705 A1* 7/2017 Ishiwata ................ H04N 5/357

FOREIGN PATENT DOCUMENTS

JP 2015-226161 A 12/2015

* cited by examiner

*Primary Examiner* — Christopher K Peterson
(74) *Attorney, Agent, or Firm* — Canon U.S.A., Inc. IP Division

(57) ABSTRACT

The present disclosure is related to an imaging device, an imaging system, and a moving body. The imaging device according to an exemplary embodiment includes: a plurality of pixels and a connection transistor. Each of the plurality of pixels includes a photoelectric conversion unit, an amplification transistor that outputs a signal based on an electric charge generated in the photoelectric conversion unit, and a selection transistor that connects a source of the amplification transistor and an output line. The connection transistor includes two nodes, a conducting state between the two nodes being controlled by a signal supplied to a gate of the connection transistor. One of the two nodes is connected to the source of the amplification transistor of a first pixel included in the plurality of pixels. The other is connected to the source of the amplification transistor of a second pixel included in the plurality of pixels.

31 Claims, 11 Drawing Sheets

IMAGING DEVICE, IMAGING SYSTEM, AND MOVING BODY HAVING PIXELS WITH A CONNECTION TRANSISTOR

BACKGROUND OF THE INVENTION

Field of the Invention

One disclosed aspect of the embodiments relates to an imaging device, an imaging system, and a moving body having pixels with a connection transistor.

Description of the Related Art

A technique of mixing signals from a plurality of pixels in an imaging device has been known. An imaging device disclosed in Japanese Patent Laid-Open No. 2015-226161 includes a plurality of pixels that are connected to a column output line. A plurality of pixels are simultaneously selected, and thereby signals from the plurality of pixels are mixed in a column signal line. Specifically, each of the pixels includes a selection transistor. By simultaneously turning on the selection transistors of two pixels, signals from the two pixels are mixed.

SUMMARY OF THE INVENTION

An imaging device according to an embodiment includes: a plurality of pixels each of which includes a photoelectric conversion unit, an amplification transistor that outputs a signal based on an electric charge generated in the photoelectric conversion unit, and a selection transistor that connects a source of the amplification transistor and an output line; and a connection transistor that includes two nodes, a conducting state between the two nodes being controlled by a signal supplied to a gate of the connection transistor. One of the two nodes is connected to the source of the amplification transistor of a first pixel included in the plurality of pixels. The other of the two nodes is connected to the source of the amplification transistor of a second pixel included in the plurality of pixels.

An imaging device according to another embodiment includes: a plurality of pixels, a first output line, a second output line and a connection transistor. Each of the plurality of pixels includes a photoelectric conversion unit, an amplification transistor that outputs a signal based on an electric charge generated in the photoelectric conversion unit, and a selection transistor that connects a source of the amplification transistor and an output line. The first output line is connected, via the selection transistor of a first pixel included in the plurality of pixels, to the source of the amplification transistor of the first pixel. The second output line is connected, via the selection transistor of a second pixel included in the plurality of pixels, to the source of the amplification transistor of the second pixel. The connection transistor connects the source of the amplification transistor of the first pixel and the source of the amplification transistor of the second pixel via a path that does not include the selection transistor of the first pixel and the selection transistor of the second pixel.

An imaging device according to still another embodiment includes: a plurality of pixels and a connection transistor. Each of the plurality of pixels includes a photoelectric conversion unit, an amplification transistor that outputs a signal based on an electric charge generated in the photoelectric conversion unit, and a selection transistor that connects a source of the amplification transistor and an output line. In a case where both the selection transistor of a first pixel included in the plurality of pixels and the selection transistor of a second pixel included in the plurality of pixels are in an on state, the connection transistor connects the source of the amplification transistor of the first pixel and the source of the amplification transistor of the second pixel via a first path in parallel to a second path including the selection transistor of the first pixel and the selection transistor of the second pixel.

Further features of the present embodiments will become apparent from the following description of exemplary embodiments with reference to the attached drawings.

DESCRIPTION OF THE EMBODIMENTS

Figure 1:
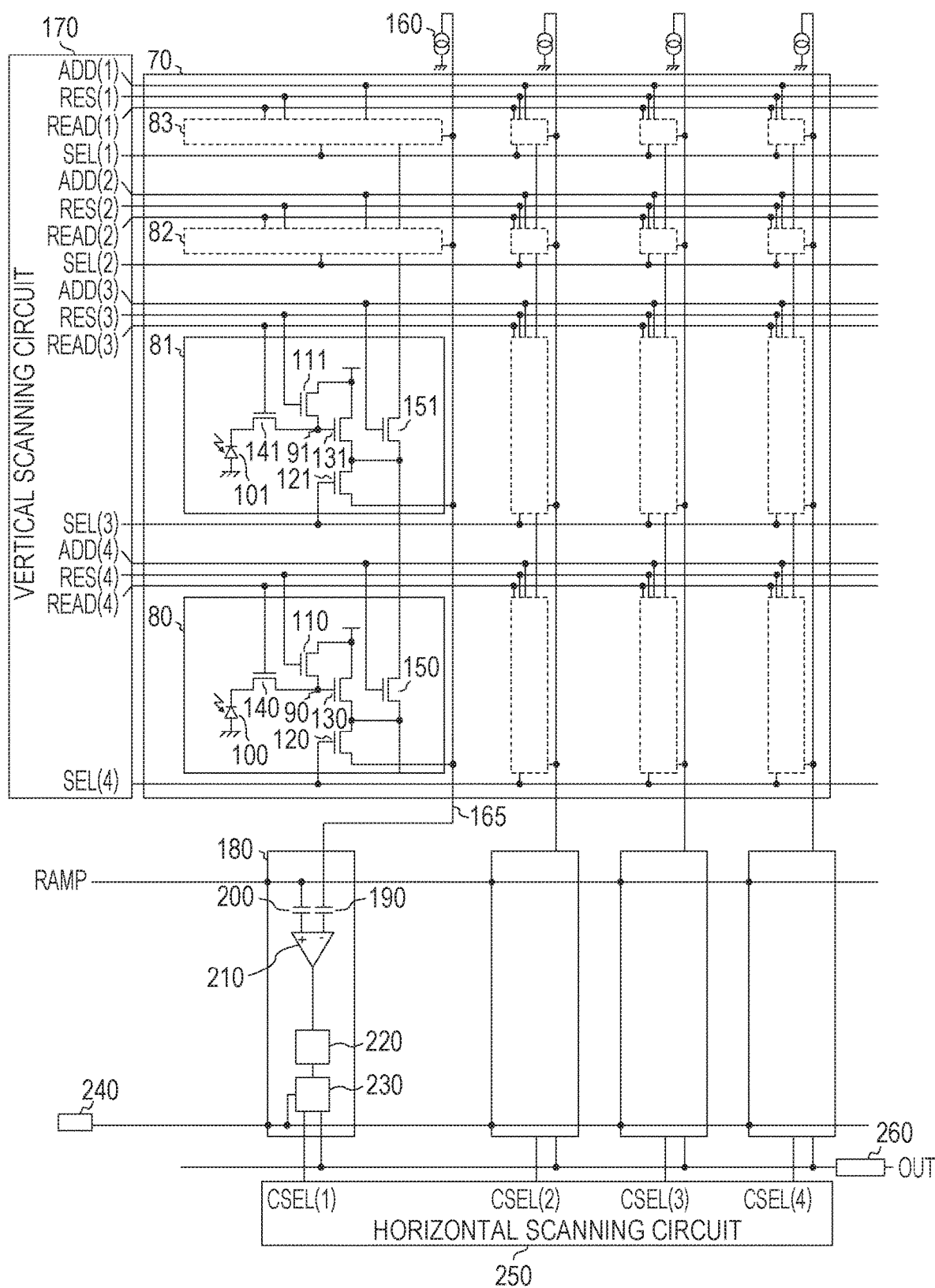
FIG. 1 is a diagram schematically illustrating a configuration of an imaging device according to an exemplary embodiment 1.

In the imaging device described in Japanese Patent Laid-Open No. 2015-226161, signals from pixels are mixed by turning on selection transistors of a plurality of pixels. Therefore, in a case where any of the selection transistors malfunctions, there is a possibility that the signals of the plurality of pixels are not mixed correctly. Thus, there is a possibility of a deterioration in image quality.

In addition, in the imaging device described in Japanese Patent Laid-Open No. 2015-226161, it is difficult to mix, in a column output line, signals from two pixels which are connected to different column output lines. Thus, there is a possibility that only limited types of signal reading methods may be used.

An imaging device according to an exemplary embodiment includes a plurality of pixels. Each of the pixels includes at least a photoelectric conversion unit, an amplification transistor, and a selection transistor. The amplification transistor outputs a signal based on an electric charge generated in the photoelectric conversion unit. The selection transistor connects the amplification transistor and an output line.

Generally, an imaging device includes a plurality of output lines associated with a plurality of pixel columns each of which is composed of a plurality of pixels. The plurality of pixels may be connected one common output line or may be connected to output lines that are mutually different.

The imaging device includes a connection transistor that connects a source of the amplification transistor of a first pixel and a source of the amplification transistor of a second pixel which is different from the first pixel. The connection transistor connects the source of the amplification transistor of the first pixel and the source of the amplification transistor of the second pixel by a path that does not include the selection transistor of the first pixel and the selection transistor of the second pixel. From a different point of view, when the selection transistors of both the first pixel and the second pixel are turned on, the connection transistor forms the path by which the source of the amplification transistor of the first pixel and the source of the amplification transistor of the second pixel are connected in parallel with the selection transistors. By the connection transistor, it is possible to combine, mix, add, or average signals from the two pixels.

For example, the connection transistor includes two nodes a conducting state of which is controlled in accordance with a signal supplied to a gate. Controlling the conducting state in accordance with the signal supplied to the gate namely means that, when the connection transistor is turned on, a current path is formed between the two nodes. The two nodes are generally a source and a drain of the connection transistor. One of the two nodes of the connection transistor is connected to the source of the amplification transistor of the first pixel. The other of the two nodes of the connection transistor is connected to the source of the amplification transistor of the second pixel. Such connection is an example of connection by the path that connects sources of amplification transistors of two pixels by a path that does not include selection transistors.

In some exemplary embodiments, with such a configuration, it is possible to suppress deterioration in image quality or improve a degree of freedom of the signal reading method or achieve both of them. Hereinafter, exemplary embodiments will be described. A constituent of each of the exemplary embodiments is able to be added to another exemplary embodiment, or replaced with a constituent of another exemplary embodiment. The disclosure is not limited to the exemplary embodiments described below.

[Exemplary Embodiment 1]

FIG. 1 is a diagram schematically illustrating an entire configuration of an imaging device related to an exemplary embodiment 1. Moreover, FIG. 1 illustrates an equivalent circuit diagram of a part of the configuration.

The imaging device is provided with a plurality of pixels 80 to 83 that constitute a pixel array 70. The pixel array 70 illustrated in FIG. 1 includes four pixel rows and four pixel columns. However, the number of pixels is not limited thereto. Moreover, the imaging device is provided with output lines 165 that are disposed correspondingly to the pixel columns, current sources 160 each of which is connected to a corresponding one of the output lines 165, and a vertical scanning circuit 170 that supplies a control signal to each of the plurality of pixels 80 to 83. In the present exemplary embodiment, the plurality of pixels 80 to 83 that are included in one pixel column are connected to one common output line 165.

The pixel 80 includes a floating diffusion portion (hereinafter, an FD portion), a photodiode 100, a reset transistor 110, a selection transistor 120, an amplification transistor 130, a transfer transistor 140, and a connection transistor 150.

The photodiode 110 is an example of a photoelectric conversion unit. The photodiode 100 generates an electric charge according to light incident on the pixel 80 and accumulates the electric charge. The photodiode 100 is connected to the FD portion 90 via the transfer transistor 140. A gate of the amplification transistor 130 is connected to the FD portion 90. A power source voltage VDD is supplied to a drain of the amplification transistor 130. A source of the amplification transistor 130 is connected to the output line 165 via the selection transistor 120. Generally, the amplification transistor 130 includes two nodes between which a current flows. One of the two nodes, which is closer to the power source voltage VDD, is the drain, and the other is the source. The FD portion 90 is connected to the power source voltage VDD via the reset transistor 110. The reset transistor 110 constitutes a reset part.

The transfer transistor 140, the reset transistor 110, and the selection transistor 120 are controlled to be in a conducting state (on state) or a non-conducting state (off state) by control signals READ, RES, and SEL which are supplied from the vertical scanning circuit 170, respectively. Note that, a number added to an end of each reference sign indicates a number of each pixel row.

When the control signal RES changes to a high level, the reset transistor 110 is brought into the conducting state, and the FD portion 90 is connected to the power source voltage VDD. A voltage of the FD portion 90 is thereby reset. A signal output from the pixel 80 in this state is a reset signal. When the control signal READ changes to the high level, the transfer transistor 140 is brought into the conducting state, and the electric charge accumulated in the photodiode 100 is transferred to the FD portion 90. A signal output from the pixel 80 in this state is an optical signal. When the control signal SEL changes to the high level, the selection transistor 120 is brought into the conducting state, and a current is supplied to the amplification transistor 130 from the current source 160 via the output line 165. Since the amplification transistor 130 and the current source 160 constitute a source follower circuit, when the selection transistor 120 is turned on, a pixel signal (the reset signal or the optical signal) based on a voltage of the FD portion 90 is read to the output line 165.

The pixel 81 includes an FD portion 91, a photodiode 101, a reset transistor 111, a selection transistor 121, an amplification transistor 131, a transfer transistor 141, and a connection transistor 151. Though not illustrated in FIG. 1, the pixel 82 includes an FD portion 92, a photodiode 102, a reset transistor 112, a selection transistor 122, an amplification transistor 132, a transfer transistor 142, and a connection transistor 152. The similar applies to the pixel 83. Since constituents of each of the pixels have the same functions, description thereof is omitted.

The connection transistor 150 of the pixel 80 connects the source of the amplification transistor 130 of the pixel 80 and a source of the amplification transistor 131 of the pixel 81. A control signal ADD is supplied to a gate of the connection transistor 150. A conducting state between a source and a drain of the connection transistor 150 is controlled by the control signal ADD. That is, the connection transistor 150 includes two nodes the conducting state of which is controlled on the basis of the signal supplied to the gate. One of the source and the drain of the connection transistor 150 is connected to the source of the amplification transistor 130 of the pixel 80. The other of the source and the drain of the connection transistor 150 is connected to the source of the amplification transistor 131 of the pixel 81.

Similarly, the connection transistor 151 of the pixel 81 connects the source of the amplification transistor 131 of the pixel 81 and a source of the amplification transistor 132 of the pixel 82. The similar applies to the other pixels. Though not illustrated in FIG. 1, for example, the connection transistor 152 of the pixel 82 connects the source of the amplification transistor 132 of the pixel 82 and a source of an amplification transistor 133 of the pixel 83. The pixel 83 might not include a connection transistor.

Each of the output lines 165 is connected to a corresponding one of column circuits 180. The pixel signal read to the output line 165 is input to the column circuit 180. The column circuit 180 includes a pixel signal input capacitance 190, a ramp signal input capacitance 200, a comparator 210, a pulse generator 220, a digital memory 230, and a counter 240. The pixel signal of the output line 165 is input to a first input node of the comparator 210 via the pixel signal input capacitance 190. Moreover, a ramp signal is input to a second input node of the comparator 210 via the ramp signal input capacitance 200. The comparator 210 compares the pixel signal and the ramp signal. The digital memory 230 holds a count value that is output by the counter 240 when a relation of the pixel signal and the ramp signal is inverted. The count value held by the digital memory 230 is a digital signal converted from the pixel signal. That is, the column circuit 180 constitutes an analog-to-digital conversion circuit that performs analog-to-digital conversion on the pixel signal read to the output line 165.

The pixel signal converted to the digital signal in the column circuit 180 is read to a signal processing circuit 260 on the basis of a control signal that is supplied from a horizontal scanning circuit 250. The signal processing circuit 260 outputs the pixel signal to an outside. The signal processing circuit 260 is able to perform signal processing such as difference processing or correction.

Next, an operation of the imaging device of the present exemplary embodiment will be described. In the present exemplary embodiment, when the connection transistor is turned on, signals of at least two pixels are spuriously added. The term "add" in the present specification is used for a meaning similar to those of "mix", "combine", and "average". The term "add" in the present specification means generating, from at least two signals, one signal that includes components of the two signals, and therefore includes calculation such as addition, subtraction, multiplication, division, and the like.

First, an operation in a case where addition is not performed will be described. In the case where addition is not performed, all of control signals ADD(1) to (4) are set to be at a low level, and the connection transistors 150 to 153 are in an off state in the pixels 80 to 83. In this state, a control signal SEL(4) is set to be at the high level, a row (first row) including the pixel 80 is brought into a selected state, and reading is performed. In a reading operation, a control signal RES(4) is set to be at the high level and a potential of the FD portion 90 is set to be at a reset level. Thereafter, the control signal RES(4) is set to be at a low level and reset is finished. The amplification transistor 130 of the pixel 80 outputs a reset signal. Then, a control signal READ(4) is set to be at the high level, and a photoelectric charge accumulated in the photodiode 100 is transferred to the FD portion 90. The potential of the FD portion 90 is at a signal level that is lowered in accordance with an electric charge amount. Therefore, an optical signal is output to the output line 165 from the pixel 80 by the source follower circuit constituted by the amplification transistor 130 and the current source 160.

In the column circuit 180, first, the reset signal is clamped by the pixel signal input capacitance 190. Thereafter, when the optical signal is output from the pixel 80, a difference signal between the reset signal and the optical signal is held at an inverting input terminal of the comparator 210. Thereby, reset noise, threshold variation of the amplification transistor 130, and the like which occur in the pixel 80 are removed.

Next, an AD conversion operation will be described. In accordance with a gradual lowering of a potential of the RAMP signal, the counter 240 performs a counting operation and supplies a count signal to the digital memory 230. When the RAMP signal is lowered by an amount of the difference signal held by the inverting input terminal of the comparator 210, an output of the comparator 210 is inverted. In accordance with the inversion of the output of the comparator 210, the pulse generator 220 generates a one-shot pulse and supplies the pulse to the digital memory 230. In response to the pulse from the pulse generator 220, the digital memory 230 holds the count signal from the counter 240. A time until the output of the comparator 210 is inverted changes in accordance with the difference signal held by the inverting input terminal of the comparator 210. Therefore, the count value held in the digital memory 230 changes. That is, the count value held by the digital memory 230 is a digital signal converted from the pixel signal. The digital signal held by the digital memory 230 is sequentially output by the horizontal scanning circuit 250 via the signal processing circuit 260.

The control signal SEL(4) is set to be at the low level to cancel the selected state of the row (first row) including the pixel 80. Thereby, signal reading from the row (first row) including the pixel 80 is finished. Subsequently, in a state where all of the control signals ADD(1) to (4) are at the low level, a control signal SEL(3) is set to be at the high level. A row (second row) including the pixel 81 is brought into the selected state, and signal reading from the pixel 81 is started. A subsequent operation is the same as that of reading of the first row. Such a signal reading operation is sequentially performed for reading target rows.

Next, a case where addition of signals from a plurality of pixels is performed will be described. Description will be given here for a case where signals from two pixels that are arrayed in a pixel column direction are added. By setting the control signal ADD(4) to be at the high level, it is possible to add a pixel signal from the pixel 80 and a pixel signal from the pixel 81. By setting the control signal ADD(2) to be at the high level, it is possible to add a pixel signal from the pixel 82 and a pixel signal from the pixel 83. In the present exemplary embodiment, the two added signals are read in order.

First, the control signals ADD(2) and (4) are set to be at the high level and the control signals ADD(1) and (3) are set to be at the low level. The connection transistor 150 and the connection transistor 152 are therefore turned on. In this state, the control signals SEL(3) and (4) are set to be at the high level, and thereby two rows of the row including the pixel 80 and the row including the pixel 81 are simultaneously brought into the selected state.

Next, the control signals RES(3) and (4) are set to be at the high level, and the potential of the FD portion 90 and a potential of the FD portion 91 are set to be at the reset level. Thereafter, the control signals RES(3) and (4) are set to be at the low level to finish resetting. At this time, the potential of the FD portion 90 and the potential of the FD portion 91 are almost equal, and therefore about a half of a current to be supplied from the current source 160 is supplied to each of the amplification transistor 130 and the amplification transistor 131. Thus, reset signals of the two pixels are output. Since the connection transistor 150 is in the on state at this time, the reset signals of the two pixels are added.

Then, the control signals READ(3) and (4) are set to be at the high level, and photoelectric charges accumulated in the photodiodes 100 and 101 are respectively transferred to the FD portions 90 and 91. The potential of each of the FD portions 90 and 91 is lowered in accordance with a transferred electric charge amount. In this case, optical signals from the two pixels are added.

Here, a case where the pixel 80 is in a state of being irradiated with intense light and the pixel 81 is in a dark state will be considered. That is, a large amount of an electric charge is transferred to the FD portion 90 of the pixel 80, while an electric charge is substantially not transferred to the FD portion 91 of the pixel 81. At this time, the potential of the FD portion 90 of the pixel 80 is lowered from the reset level by a voltage $\Delta V$ that corresponds to the transferred electric charge amount. On the other hand, the potential of the FD portion 91 remains at the reset level or is very close to the reset level. Thereby, a difference is generated between a gate potential of the amplification transistor 130 and a gate potential of the amplification transistor 131. Since the sources of the amplification transistor 130 and the amplification transistor 131 are common, a difference is generated between gate-source voltages. Thereby, a current of the amplification transistor 130 is reduced, while a current of the amplification transistor 131 is increased by the amount of reduction. The amount of the reduction and an amount of the increase are almost equal, and therefore an amount of reduction in the gate-source voltage of the amplification transistor 130 and an amount of increase in the gate-source voltage of the amplification transistor 131 are almost equal, and have values about $\Delta V/2$. Thus, $\Delta V/2$ that is an average value of the potential of the FD portion 90 and the potential of the FD portion 91 is output from the output line 165. The average value may not necessarily be correct, since a value which is close to an average value of respective outputs obtained by performing reading individually without actually performing addition is output.

Here, the selection transistor 120 of the pixel 80, the selection transistor 121 of the pixel 81, and the connection transistor 150 are normally in the on state. Accordingly, two paths are formed as connection paths electrically connecting the source of the amplification transistor 130 of the pixel 80 and the source of the amplification transistor 131 of the pixel 81. One of the paths is formed by the selection transistor 120, the selection transistor 121, and the output line 165. The other path is formed by the connection transistor 150. In this manner, the connection transistor forms a path that connects sources of amplification transistors of two pixels by a path different from a path formed by selection transistors, and therefore it is possible to suppress deterioration in image quality.

For example, a case where there is disconnection in a control line and the selection transistor 120 of the pixel 80 is in the off state at all times will be considered. In a case where the connection transistor 150 is not provided, that is, a case where the source of the amplification transistor 130 of the pixel 80 and the source of the amplification transistor 131 of the pixel 81 are disconnected, the potential of the FD portion 90 of the pixel 80 is not likely to affect a potential of the output line 165. Therefore, there is a possibility that a pixel signal at an erroneous level, which indicates that, for example, both of the pixels 80 and 81 are in the dark state, is output. That is, there is a possibility of deterioration in image quality in both an image when a signal is individually read from each pixel and an image when signals from a plurality of pixels are added.

In the present exemplary embodiment, when signals are output from the pixel 80 and the pixel 81, the connection transistor 150 is in the on state. Thereby, even when the selection transistor 120 is in the off state, part of a current supplied from the current source 160 flows to the amplification transistor 130 of the pixel 80, and another part of the current supplied from the current source 160 flows to the amplification transistor 131 of the pixel 81. Thus, it is possible to add the pixel signal of the pixel 80 and the pixel signal of the pixel 81. That is, it is possible to suppress deterioration in image quality of an image that is obtained when signals from a plurality of pixels are added.

Note that, in the case where the selection transistor 120 is in the off state at all times, the amplification transistor 130 is connected to the output line 165 via the connection transistor 150 and the selection transistor 121. On the other hand, the amplification transistor 131 is connected to the output line 165 only via the selection transistor 121. When on-resistance of the connection transistor 150 is great, a voltage drop in the connection transistor 150 becomes great, and therefore there is a possibility that the amplification transistor 130 and the amplification transistor 131 become unequal. In such a case, an error may occur in a signal which is to be output as a result of addition. Thus, in the present exemplary embodiment, a threshold voltage Vth of the connection transistor 150 is lower than a threshold voltage of the selection transistor 120 and a threshold voltage of the selection transistor 121. With such threshold voltages, it is possible to make an influence of the voltage drop caused by the on-resistance of the connection transistor 150 less apparent.

However, a relation between the threshold voltages is not limited to the above. The threshold voltage Vth of the connection transistor 150, the threshold voltage of the selection transistor 120, and the threshold voltage of the selection transistor 121 may be equal to each other.

After reading of the signals from the pixel 80 and the pixel 81 is finished, the control signals SEL(3) and (4) are set to be at the low level. Subsequently, control signals SEL(1) and (2) are set to be at the high level, and two rows of a row including the pixel 82 and a row including the pixel 83 are simultaneously brought into the selected state.

In a circuit of FIG. 1, the connection transistor connects two pixels that are adjacent to each other. In a general imaging device, a color filter array of a Bayer array is used. Accordingly, color filters having different colors are arranged in the two adjacent pixels in some cases. Then, another pixel (third pixel) may be arranged between the two pixels (a first pixel and a second pixel) connected by the connection transistor. In this case, it is desired that, when the connection transistor is in an on state, a source of an amplification transistor of the third pixel is disconnected from sources of amplification transistors of the other two pixels. With such a configuration, it is possible to obtain an image with high image quality in the imaging device having the color filter array of the Bayer array.

As described above, the imaging device of the present exemplary embodiment includes a connection transistor that connects a source of an amplification transistor of a first pixel (for example, the pixel 80) and a source of an amplification transistor of a second pixel (for example, the pixel 81). With such a configuration, it is possible to suppress deterioration in image quality.

[Exemplary Embodiment 2]

Another exemplary embodiment will be described. In the present exemplary embodiment, two pixels constitute one pixel unit. Moreover, a plurality of output lines are provided for one pixel column. A point different from the exemplary embodiment 1 will be described, and description for the same part as the exemplary embodiment 1 will be omitted.

Figure 2:
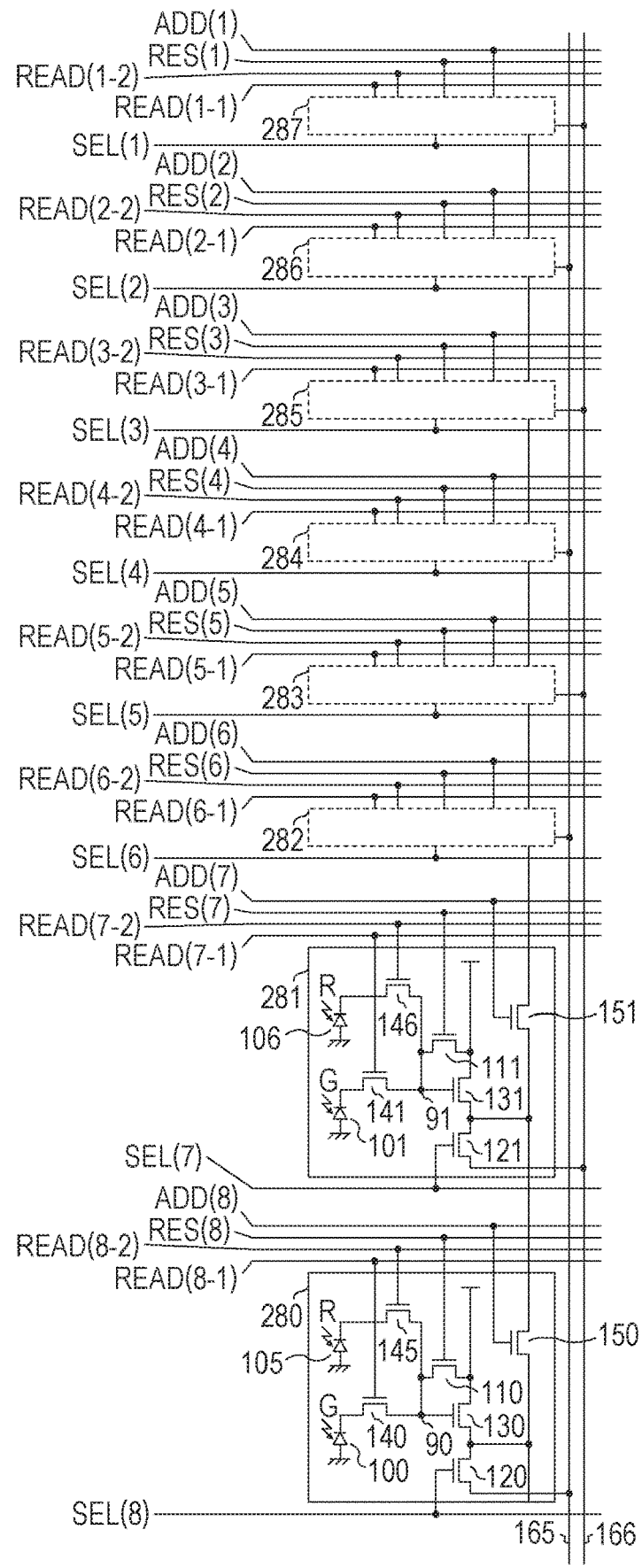
FIG. 2 is a diagram schematically illustrating a configuration of an imaging device according to an exemplary embodiment 2.

FIG. 2 is a schematic diagram of an imaging device related to an exemplary embodiment 2. FIG. 2 illustrates only one pixel column. Actually, a pixel array includes a plurality of pixel columns and a plurality of pixel rows. Pixel units 280 to 287 are illustrated in FIG. 2.

The imaging device of the present exemplary embodiment is provided with a color filter array of the Bayer array. The pixel unit 280 has the photodiode 100 in which a green color filter is arranged and a photodiode 105 in which a red color filter is arranged. That is, one pixel unit has two pixels that are arrayed in the pixel column direction. The photodiode 100 is connected, via the transfer transistor 140, to the FD portion 90 serving as an input node of the amplification transistor 130. The photodiode 105 is connected, via a transfer transistor 145, to the FD portion 90 serving as the input node of the amplification transistor 130. By such connection, the amplification transistor 130 of the pixel unit 280 outputs a signal based on an electric charge generated in the photodiode 100 and a signal based on an electric charge generated in the photodiode 105. Each of the transfer transistor 140 and the transfer transistor 145 is controlled to be in the conducting state (on state) or the non-conducting state (off state) by the control signal READ which is supplied from the vertical scanning circuit 170. Note that, a number added to an end of each reference sign indicates a number of each pixel row. Since the other constituents included in the pixel unit 280 are the same as those of the exemplary embodiment 1, description thereof will be omitted.

Each of the other pixel units 281 to 287 basically has the same configuration as that of the pixel unit 280. In order to distinguish an element of a different pixel, a different reference sign is assigned. For example, the pixel unit 281 has the photodiode 101 in which a green color filter is arranged and a photodiode 106 in which a red color filter is arranged. The photodiode 101 is connected, via the transfer transistor 141, to the FD portion 91 serving as an input node of the amplification transistor 131. The photodiode 106 is connected, via a transfer transistor 146, to the FD portion 91 serving as the input node of the amplification transistor 131.

The connection transistor 150 connects the source of the amplification transistor 130 of the pixel unit 280 and the source of the amplification transistor 131 of the pixel unit 281. The control signal ADD is supplied to the gate of the connection transistor 150. The conducting state between the source and the drain of the connection transistor 150 is controlled by the control signal ADD. That is, the connection transistor 150 includes two nodes the conducting state of which is controlled on the basis of the signal supplied to the gate. One of the source and the drain of the connection transistor 150 is connected to the source of the amplification transistor 130 of the pixel unit 280. The other of the source and the drain of the connection transistor 150 is connected to the source of the amplification transistor 131 of the pixel unit 281.

Similarly, the connection transistor 151 connects the source of the amplification transistor 131 of the pixel unit 281 and the source of the amplification transistor 132 of the pixel unit 282. The similar applies to the other connection transistors 152 to 157 each of which is included in each of the other pixel units.

A pixel in the present exemplary embodiment is defined as a unit that includes a photodiode, an amplification transistor, and a selection transistor. For example, a first pixel includes the photodiode 100, the amplification transistor 130, and the selection transistor 120. A second pixel includes the photodiode 101, the amplification transistor 131, and the selection transistor 121. In this manner, two pixels that do not share a circuit element may be defined. Moreover, a third pixel includes the photodiode 105, the amplification transistor 130, and the selection transistor 120. That is, the first pixel and the third pixel share the amplification transistor 130 and the selection transistor 120. In this manner, two pixels that share a circuit element may be defined. A plurality of pixels constituting one pixel unit share any of the circuit elements.

The imaging device of the present exemplary embodiment has two output lines 165 and 166 for one pixel row. The source of the amplification transistor 130 of the pixel unit 280 is connected to the output line 165 via the selection transistor 120. The source of the amplification transistor 131 of the pixel unit 281 is connected to the output line 166 via the selection transistor 121. Connection of the other pixel units 282 to 287 is as illustrated in FIG. 2. Accordingly, half the entire pixel units included in one pixel row is connected to each of the output line 165 and the output line 166.

Though not illustrated, the column circuit 180 is connected to each of the output lines 165 and 166. A configuration subsequent to the column circuit 180 and configurations of the vertical scanning circuit 170 and the horizontal scanning circuit 250 are the same as those of the exemplary embodiment 1.

Next, an operation of the imaging device of the present exemplary embodiment will be described. First, an operation in a case where pixel addition is not performed will be described. In the case where addition is not performed, all of control signals ADD(1) to (8) are set to be at the low level, and the connection transistor 150 is in the off state in the pixel units 280 to 287. In this state, control signals SEL(7) and (8) are set to be at the high level. Thereby, the pixel unit 280 and the pixel unit 281 are selected. The pixel unit 280 and the pixel unit 281 are connected to the different output lines, and therefore it is possible to simultaneously read pixel signals from the pixel unit 280 and the pixel unit 281.

As an example, a signal (optical signal) based on an electric charge generated in the photodiode 105 (third pixel) of the pixel unit 280 and a signal (optical signal) based on an electric charge generated in the photodiode 101 (second pixel) of the pixel unit 281 are read. The signal (optical signal of the third pixel) based on the electric charge generated in the photodiode 105 is read to the output line 165. The signal (optical signal of the second pixel) based on the electric charge generated in the photodiode 101 is read to the output line 166. An operation for reading each of the signals is performed in the same manner as the reading operation of a pixel signal of the exemplary embodiment 1.

After finishing reading of the two optical signals, the control signal SEL(8) is set to be at the low level, and the control signals SEL(6) and (7) are simultaneously set to be at the high level. Thereby, the pixel unit 281 and the pixel unit 282 are selected. Then, a signal (optical signal of a fourth pixel included in the pixel unit 281) based on an electric charge generated in the photodiode 106 of the pixel unit 281 and a signal based on an electric charge generated in a photodiode 103 (not illustrated) of the pixel unit 282 are read. Thereafter, a similar operation is iterated.

Note that, a signal (optical signal of the first pixel included in the pixel unit 280) based on the electric charge generated in the photodiode 100 of the pixel unit 280 is not read in the example. However, the optical signal of the first pixel may be read. Moreover, by changing pixel units to be selected and a combination of transfer transistors to be brought into the conducting state, reading is able to be performed in an order different from that of the example described here.

Next, a case where addition of signals from a plurality of pixels is performed will be described. Description will be given here for an example where signals from three pixels that are arrayed in the pixel column direction are added. For example, by setting the control signals ADD(7) and (8) to be at the high level, it is possible to add signals of the pixel units 280 to 282. Moreover, by setting the control signals ADD(4) and (5) to be at the high level, it is possible to add signals of the pixel units 283 to 285. The other control signals ADD are set to be at the low level.

Figure 3A:
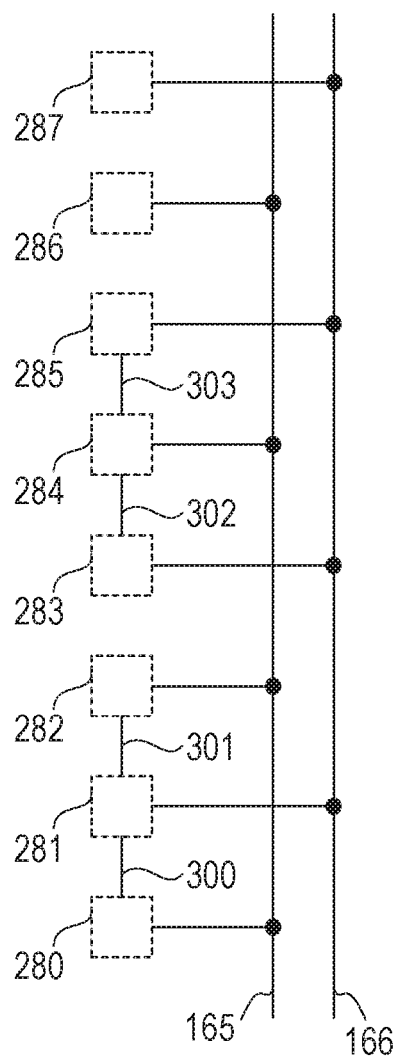
FIGS. 3A and 3B are diagrams each schematically illustrating connection of pixels in the imaging device according to the exemplary embodiment 2.

A state at this time is schematically illustrated in FIG. 3A. Each of lines 300 to 303 is schematically illustrated between two pixel units that are connected by a connection transistor. The source of the amplification transistor 130 of the pixel unit 280, the source of the amplification transistor 131 of the pixel unit 281, and the source of the amplification transistor 132 of the pixel unit 282 constitute one node. Moreover, the source of the amplification transistor 133 of the pixel unit 283, a source of an amplification transistor 134 of the pixel unit 284, and a source of an amplification transistor 135 of the pixel unit 285 constitute one node.

In this state, an electric charge of the photodiode in which the red color filter is arranged is transferred to an input node of the corresponding amplification transistor in each of the pixel units 280 to 282. Thereby, optical signals corresponding to a wavelength band of red are added. Moreover, by transferring electric charges of the photodiodes in each of which the green color filter is arranged, it is possible to add optical signals corresponding to a wavelength band of green. Since a mechanism by which the signals are added is the same as that of the exemplary embodiment 1, the detail will be omitted.

In the present exemplary embodiment, the connection transistor 150 forms a path that connects the source of the amplification transistor 130 of the pixel unit 280 and the source of the amplification transistor 131 of the pixel unit 281 by a path different from a path formed by the selection transistors 120 and 121. It is therefore possible to improve a degree of freedom of reading a signal. Specifically, in accordance with a combination of selection transistors to be brought into the conducting state (on state), an output line to which an added signal is output is able to be selected. Description thereof will be given by using the pixel units 280 to 282 as an example.

As a first output method, when the selection transistor 120 of the pixel unit 280, the selection transistor 121 of the pixel unit 281, and the selection transistor 122 of the pixel unit 282 are all turned on, the added signal is output to both of the output lines 165 and 166. Even when either the selection transistor 120 of the pixel unit 280 or the selection transistor 122 of the pixel unit 282 is in the off state, the added signal is similarly output to both the output line 165 and the output line 166.

As a second output method, it is possible to output the added signal to only one of the output line 165 and the output line 166. In a case where the selection transistor 120 of the pixel unit 280 and the selection transistor 122 of the pixel unit 282 are in the on state and the selection transistor 121 of the pixel unit 281 is in the off state, the signal is output only to the output line 165. In this case, either the selection transistor 120 of the pixel unit 280 or the selection transistor 122 of the pixel unit 282 may be in the off state. In a case where the selection transistor 120 of the pixel unit 280 and the selection transistor 122 of the pixel unit 282 are in the off state and the selection transistor 121 of the pixel unit 281 is in the on state, the signal is output only to the output line 166.

In the second output method, by reading a signal from another pixel unit to the output line to which the signal is not output, it is possible to increase a speed. Alternatively, by stopping a current source of the output line to which the signal is not output, it is possible to reduce power consumption.

Here, for example, in a case where the added signal is output to the output line 165, the pixel unit 281 outputs the signal to the output line 165 that is different from the output line 166 which is connected by the selection transistor 121 of the pixel unit 281. Such signal reading is possible, since a current is able to be supplied to the amplification transistor 131 via the connection transistor 150 or the connection transistor 151 even when the selection transistor 121 of the pixel unit 281 is in the off state. That is, the connection transistor enables addition of signals of a plurality of pixels which are connected to different output lines. In a case where no connection transistor is provided, addition is not possible between pixel units whose selection transistors are connected to different vertical lines. As a result, by providing the connection transistor, pixel reading is enabled in various ways.

Moreover, in order to realize the operation of the present exemplary embodiment, the selection transistor is preferably arranged between the source of the amplification transistor and the output line. This is because, in a case where the selection transistor is connected to the drain side of the amplification transistor, a current is not supplied to the amplification transistor, when the selection transistor is in the off state.

Figure 3B:
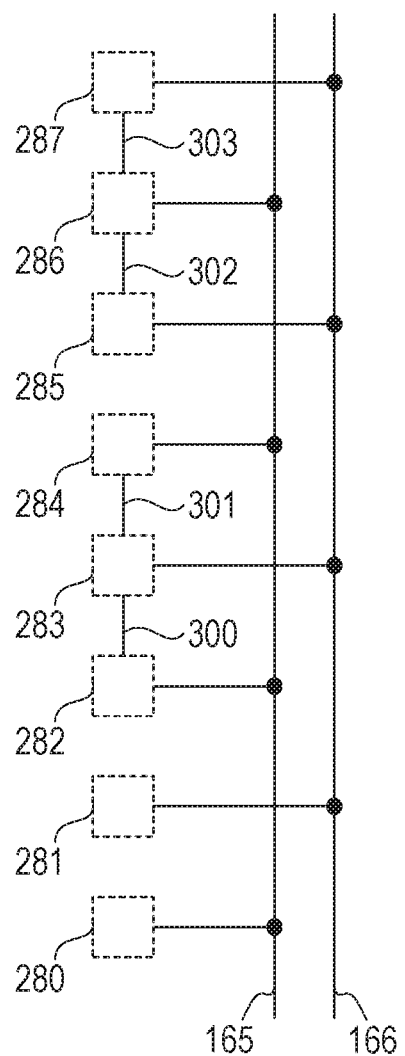

FIG. 3B schematically illustrates another combination of addition. After reading the optical signals of red in FIG. 3A, switching of the control signals ADD is performed to thereby set a state of FIG. 3B. That is, the pixel units 282 to 284 are connected to each other and the pixel units 285 to 287 are connected to each other. Then, optical signals corresponding to green are read. As described above, when signals of different colors are read, a combination of the pixel units to be connected by the connection transistor may be changed. By changing the combination of addition, it is possible to make centroids of signals to be read uniform between different colors.

Note that, also by a configuration in which a plurality of selection transistors are provided in one pixel unit and the one pixel unit is able to be connected to both of the output lines 165 and 166, various pixel signal reading is enabled. In this case, a capacitance accompanying the output lines increases, and therefore there is a possibility that increasing a speed becomes difficult. By the configuration of FIG. 2, while suppressing reduction in an operation speed, various pixel signal reading is enabled.

Description has been given above for the example in which signals from three pixel units are added. However, the number of signals to be added is not limited. For example, addition of signals from two pixel units in the pixel column direction, addition of signals from five pixel units in the pixel column direction, and the like are possible.

Next, an exemplary embodiment in which four output lines are provided for one pixel column will be described by using FIGS. 4A and 4B. A difference from FIGS. 3A and 3B is that four output lines 165 to 168 are provided. Similarly to FIGS. 3A and 3B, lines 300 to 307 schematically indicate electric paths in each of which the connection transistor is in the on state.

Figure 4A:
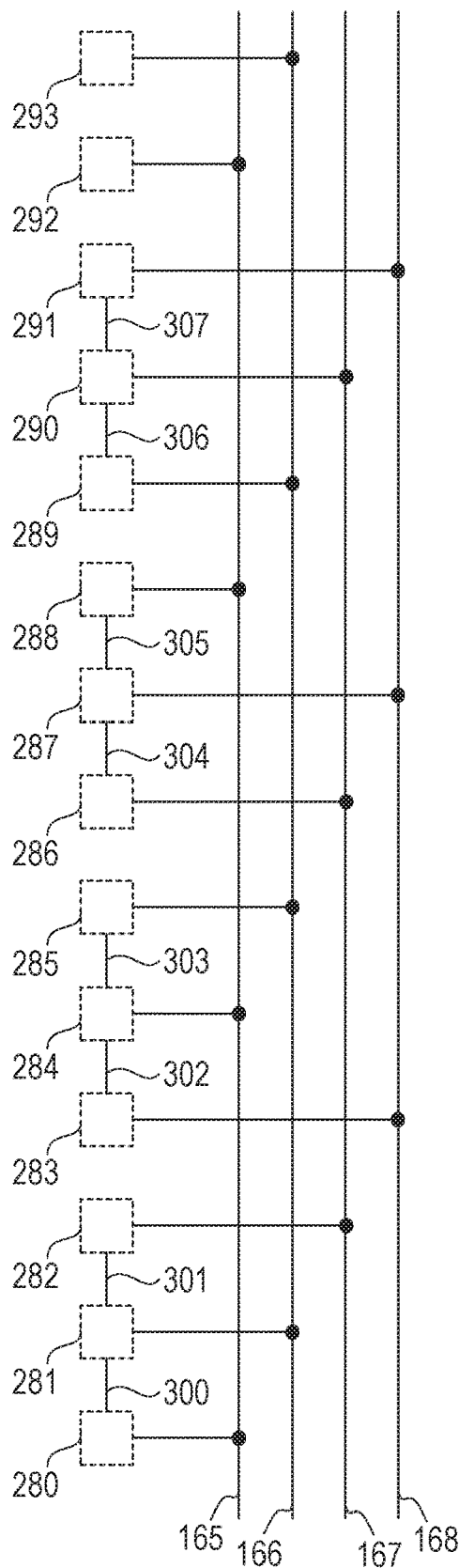
FIGS. 4A and 4B are diagrams each schematically illustrating connection of pixels in the imaging device according to the exemplary embodiment 2.
Figure 4B:
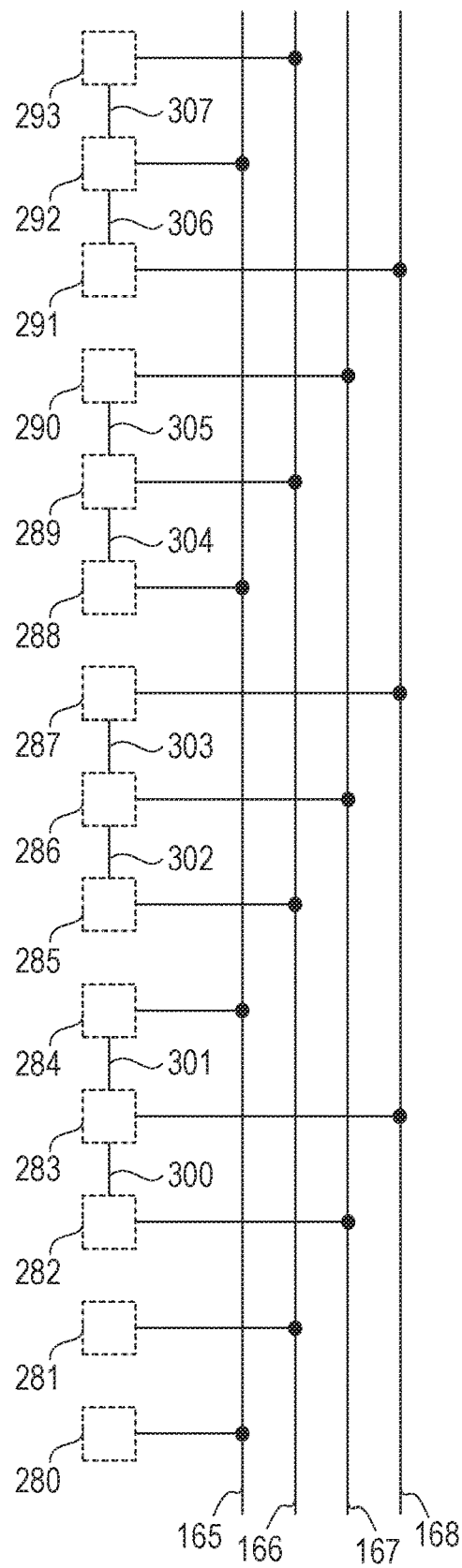

In an example illustrated in FIGS. 4A and 4B, it is possible to read four added signals in parallel. In FIG. 4A, addition of signals of photodiodes of red is performed among the pixel units 280 to 282, among the pixel units 283 to 285, among the pixel units 286 to 288, and among pixel units 289 to 291. Then, for example, signals are output to the output lines 165 to 168 via selection transistors in the pixel units 280, 285, 286, and 291, respectively. Next, in FIG. 4B, addition of signals of photodiodes of green is performed among the pixel units 282 to 284, among the pixel units 285 to 287, among the pixel units 288 to 290, and among the pixel units 291 to 293. Then, for example, signals are output to the output lines 165 to 168 via the selection transistors in the pixel units 284, 285, 289, and 291, respectively. In this manner, also in a case where four output lines are arranged for one pixel column, by providing the connection transistors, various pixel signal reading is enabled.

As described above, the imaging device of the present exemplary embodiment includes a connection transistor that connects a source of an amplification transistor of a first pixel (for example, the pixel unit 280) and a source of an amplification transistor of a second pixel (for example, the pixel unit 281). With such a configuration, it is possible to realize various signal reading methods.

[Exemplary Embodiment 3]

Figure 5:
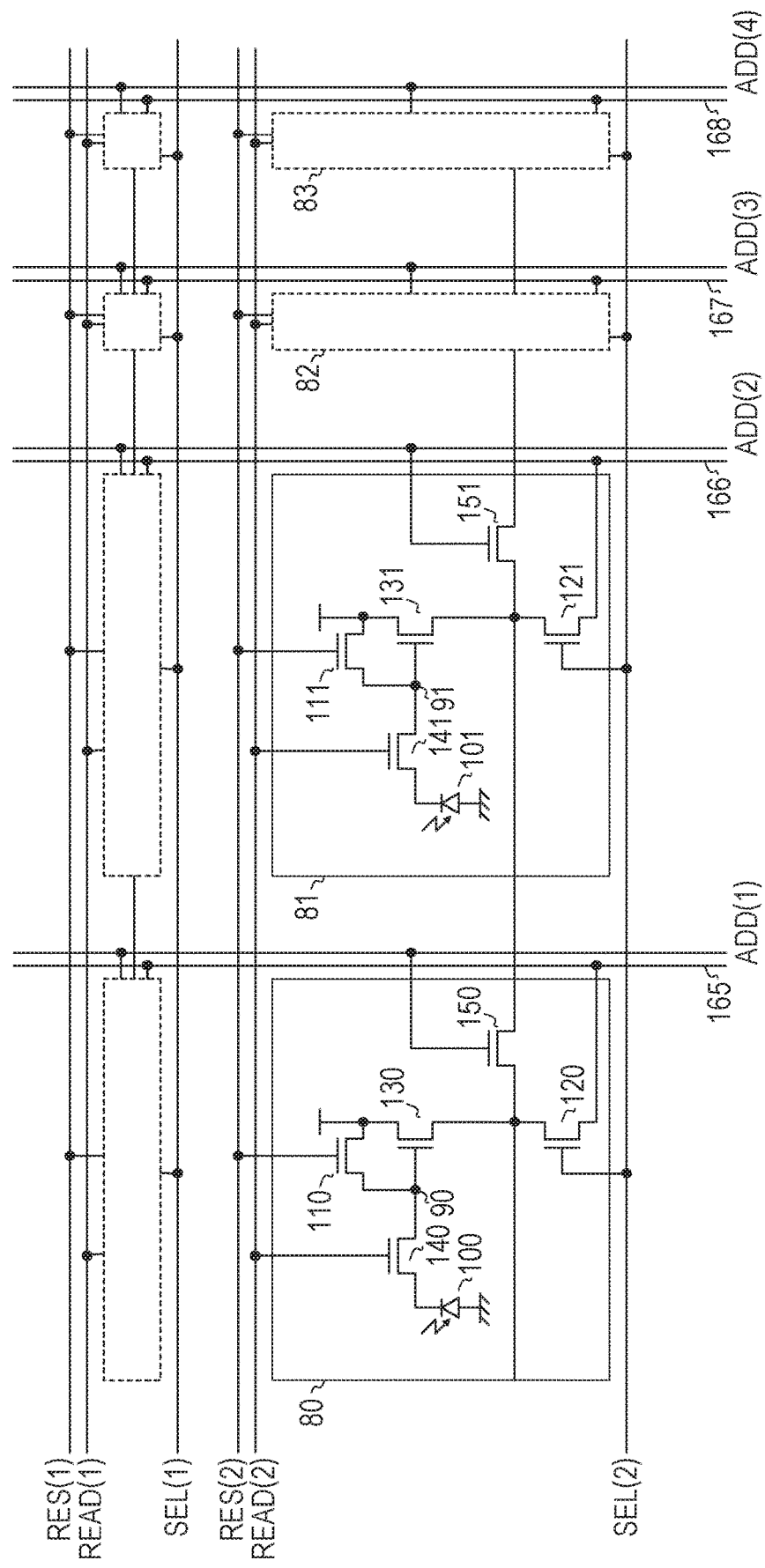
FIG. 5 is a diagram schematically illustrating a configuration of an imaging device according to an exemplary embodiment 3.

FIG. 5 illustrates a schematic diagram of an imaging device related to an exemplary embodiment 3. Pixels arrayed in two rows and four columns are illustrated. Hereinafter, only a difference from the exemplary embodiments 1 and 2 will be described.

In FIG. 5, the connection transistor connects a plurality of pixels that are arrayed in a pixel row direction. For example, the connection transistor 150 of the pixel 80 connects the source of the amplification transistor 130 of the pixel 80 and the source of the amplification transistor 131 of the pixel 81. Each control line connected to gates of connection transistors extends along the pixel column direction. Gates of connection transistors of a plurality of pixels that belong to one pixel column are connected to a common control line. Therefore, a reference sign added to an end of each control signal ADD indicates a number of each pixel column.

Next, an operation of the imaging device of the present exemplary embodiment will be described. An operation in a case where addition is not performed is the same as that of the exemplary embodiment 1. The control signals ADD(1) to (4) are set to be at the low level, and the connection transistors 150 to 153 of the pixel 80 to 83 are turned off. In this state, reading of pixel signals is performed.

A case where addition of signals from a plurality of pixels is performed will be described below. An example in which signals of two pixels arrayed in the pixel row direction are added will be described. The control signals ADD(1) and (3) are set to be at the high level and the control signals ADD(2) and (4) are set to be at the low level. Thereby, the connection transistor 150 and the connection transistor 152 are turned on. On the other hand, the connection transistor 151 and the connection transistor 153 are turned off. A signal from the pixel 80 and a signal from the pixel 81 are added, and a signal from the pixel 82 and a signal from the pixel 83 are added.

A signal obtained by adding the signal from the pixel 80 and the signal from the pixel 81 is read to both the output line 165 and the output line 166. In this case, both the selection transistor 120 of the pixel 80 and the selection transistor 121 of the pixel 81 are turned on.

In this manner, in the present exemplary embodiment, the connection transistor connects two pixels in different pixel columns. As a result, it is possible to add signals of the two pixels in the different pixel columns. Accordingly, pixel signal reading is possible in more various ways.

[Exemplary Embodiment 4]

Figure 6:
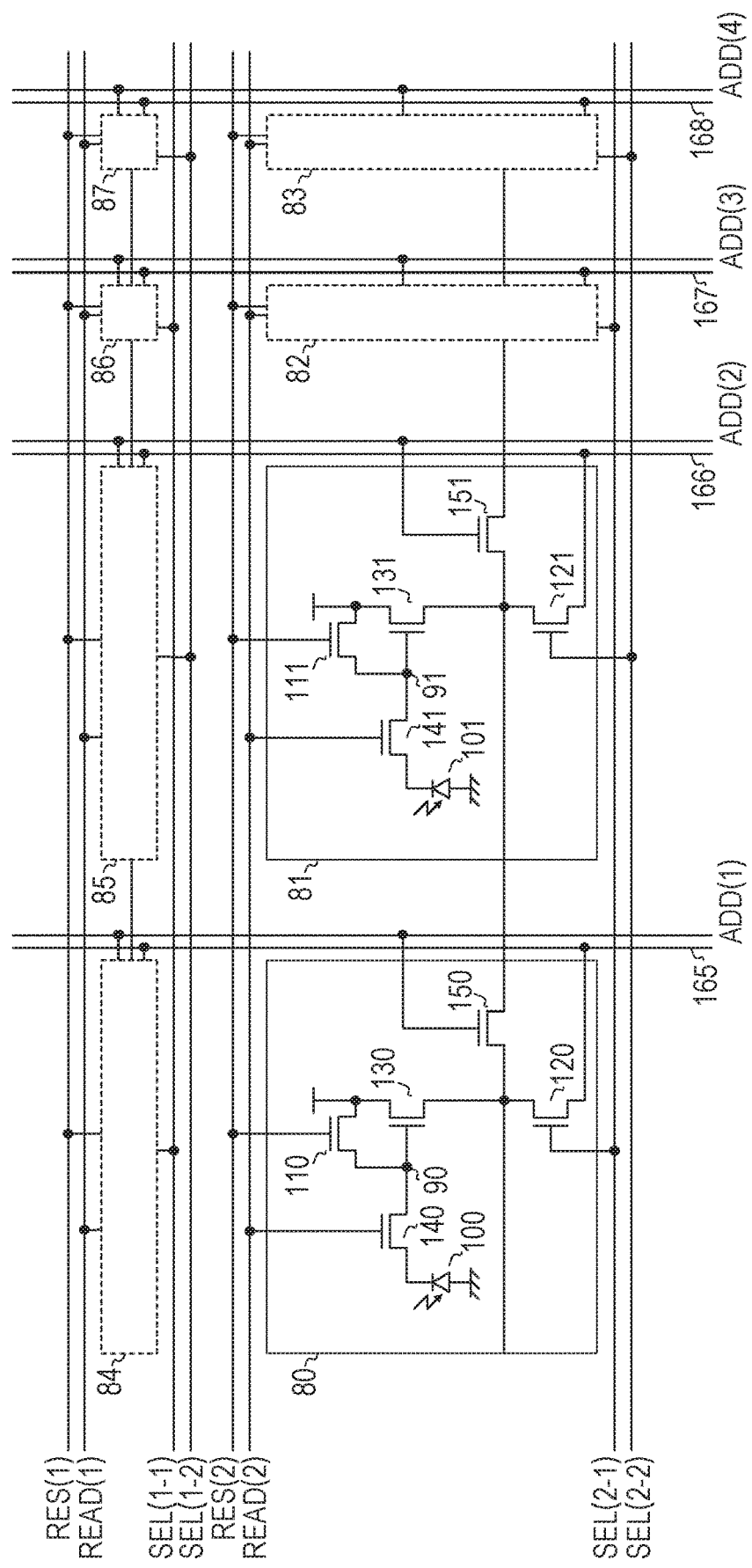
FIG. 6 is a diagram schematically illustrating a configuration of an imaging device according to an exemplary embodiment 4.

FIG. 6 illustrates a schematic diagram of an imaging device related to an exemplary embodiment 4. Only a difference from the exemplary embodiment 3 will be described below.

In FIG. 6, two control lines each of which is connected to a gate of a selection transistor are provided for one pixel row. A control line that supplies a control signal SEL(2-1) is connected to a gate of the selection transistor 120 of the pixel 80. A control line that supplies a control signal SEL(2-2) is connected to a gate of the selection transistor 121 of the pixel 81. The two control lines are electrically separated from each other. That is, the selection transistor 120 of the pixel 80 and the selection transistor 121 of the pixel 81 are able to operate independently from each other.

An operation of the imaging device of the present exemplary embodiment will be described. In a case where addition is not performed, the control signals ADD(1) to (4) are set to be at the low level, and the connection transistors 150 to 153 of the pixels 80 to 83 are brought into the off state. Moreover, in a case where one pixel row is selected, both of control signals SEL of two control lines arranged for the pixel row are set to be at the high level. The other operation is the same as those of the exemplary embodiments 1 to 3.

A case where signals from a plurality of pixels are added will be described below. An example in which signals of two pixels arrayed in the pixel row direction are added will be described. The control signals ADD(1) and (3) are set to be at the high level and the control signals ADD(2) and (4) are set to be at the low level. Thereby, the connection transistor 150 and the connection transistor 152 are turned on. On the other hand, the connection transistor 151 and the connection transistor 153 are turned off. A signal from the pixel 80 and a signal from the pixel 81 are added, and a signal from the pixel 82 and a signal from the pixel 83 are added.

For row selection, among the plurality of pixels included in one pixel row, selection transistors of half the pixels are brought into the on state to thereby read signals. For example, the control signal SEL(2-1) is set to be at the high level and the control signal SEL(2-2) is set to be at the low level. In this case, a signal obtained by adding the signal of the pixel 80 and the signal of the pixel 81 is output to the output line 165. Moreover, a signal obtained by adding the signal of the pixel 82 and the signal of the pixel 83 is output to the output line 167.

On the other hand, no signal is output to the output line 166 or the output line 168. Accordingly, it is possible to stop the current sources connected to the output lines 166 and 168. As a result, it is possible to reduce power consumption. Alternatively, currents of the current sources connected to the output line 166 and the output line 168 may be supplied to the output line 165 and the output line 167. It is thereby possible to improve a signal reading speed.

Instead, signals from another pixel row are able to be output to the output line 166 and the output line 168. By simultaneously reading signals from two pixel rows, it is possible to improve the reading speed. For example, in addition to the control signal SEL(2-1), a control signal SEL(1-2) is set to be at the high level. Thereby, a signal obtained by adding a signal of the pixel 84 and a signal of the pixel 85 is read to the output line 166. Moreover, a signal obtained by adding a signal of the pixel 86 and a signal of the pixel 87 is read to the output line 168.

Note that, in a case where signals of a plurality of pixels arrayed in a pixel row direction are added as in the present exemplary embodiment, lines each of which is connected to connection transistors and extends in the pixel row direction and the output lines 165 to 168 intersect with each other. Therefore, there is a possibility that a coupling capacitance is generated between each of the lines and each of the output lines 165 to 168. The coupling capacitance may cause crosstalk between signals of pixels, and therefore it is desired that a line for shielding is arranged between each of the lines and each of the output lines 165 to 168.

In this manner, in the present exemplary embodiment, a connection transistor connects two pixels of different pixel columns. As a result, it is possible to add signals of the two pixels in the different pixel columns. Accordingly, pixel signal reading is possible in more various ways. Furthermore, since a plurality of selection control lines are arranged in one pixel row, it is possible to increase a speed or reduce power consumption.

[Exemplary Embodiment 5]

Figure 7:
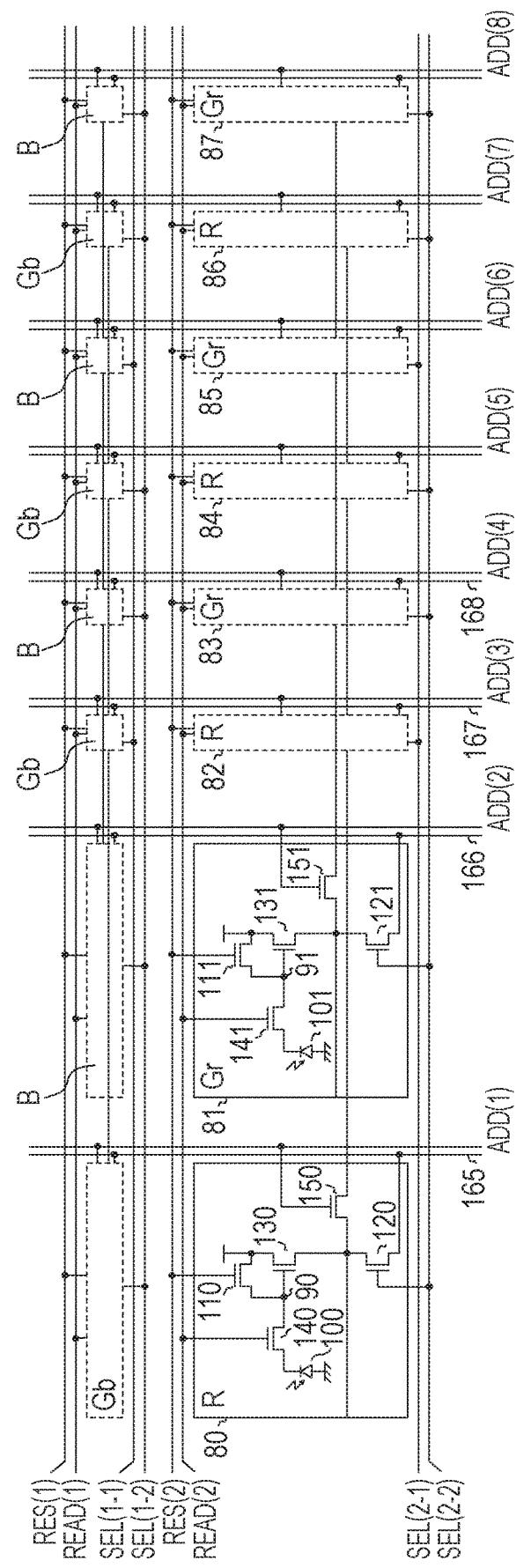
FIG. 7 is a diagram schematically illustrating a configuration of an imaging device according to an exemplary embodiment 5.

FIG. 7 illustrates a schematic diagram of an imaging device related to an exemplary embodiment 5. Only a difference from the exemplary embodiments 1 to 4 will be described below.

The imaging device of FIG. 7 includes a color filter array of the Bayer array. Color filters of two colors are arranged in one pixel row. A red color filter is arranged in each of the pixels 80, 82, 84, and 86 (hereinafter, R pixels), and a green color filter is arranged in each of the pixels 81, 83, 85, and 87 (hereinafter, Gr pixels).

In the present exemplary embodiment, the connection transistor connects a plurality of pixels that have color filters of the same color. That is, connection paths of two systems are formed by connection transistors in one pixel row. For example, the connection transistor 150 connects the source of the amplification transistor 130 of the pixel 80 and the source of the amplification transistor 132 of the pixel 82. When the connection transistor 150 is in the on state, the source of the amplification transistor 131 of the pixel 81 is disconnected from the source of the amplification transistor 130 of the pixel 80 and the source of the amplification transistor 132 of the pixel 82.

In FIG. 7, a part in which a line runs across a quadrangle that indicates a pixel indicates that a source of an amplification transistor of the pixel and a connection path are disconnected. On the other hand, in FIG. 7, a part in which a line is broken at both sides of a quadrangle that indicates a pixel indicates that a source of an amplification transistor of the pixel is connected to a connection path. The similar applies to FIG. 8.

With such a configuration, it is possible to perform addition of pixel signals for each color. That is, by setting the control signals ADD(1) and (3) to be at the high level, it is possible to add signals from the pixels 80, 82, and 84. By setting the control signals ADD(4) and (6) to be at the high level, it is possible to add signals from the pixels 83, 85, and 87. In this manner, by providing a connection path for addition for each color, addition is enabled even when an addition region of R pixels and an addition region of Gr pixels are overlapped.

Note that, also in a case where only one connection path for addition is formed for one pixel row, among pixels of the same color in the one pixel row, it is possible to perform addition of signals for two pixels out of three. For example, in FIG. 7, when a signal of the pixel 81 and a signal of the pixel 84 are not used for addition, it is possible to simultaneously perform addition of a signal of the pixel 80 and a signal of the pixel 82 and addition of a signal of the pixel 83 and a signal of the pixel 85. This is because the addition region of the R pixels and the addition region of the Gr pixels are not overlapped.

[Exemplary Embodiment 6]

Figure 8:
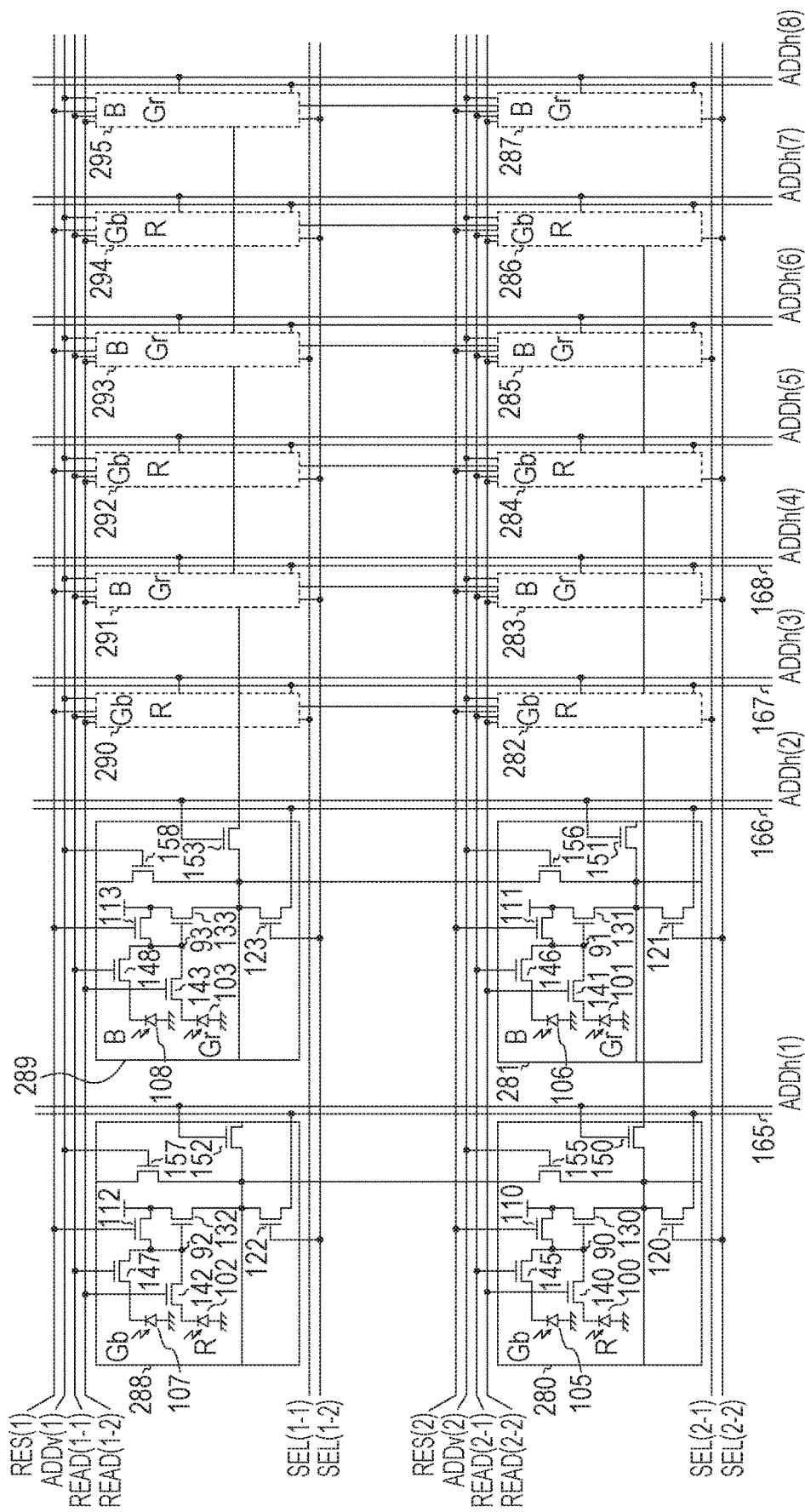
FIG. 8 is a diagram schematically illustrating a configuration of an imaging device according to an exemplary embodiment 6.

FIG. 8 illustrates a schematic diagram of an imaging device related to an exemplary embodiment 6. Only a difference from the exemplary embodiments 1 to 5 will be described below.

The imaging device of FIG. 8 includes a color filter array of the Bayer array. Moreover, similarly to FIG. 2, two pixels constitute one pixel unit. The pixel unit 280 has the photodiode 100 (R pixel) in which a red color filter is arranged and the photodiode 105 (Gr pixel) in which a green color filter is arranged. The photodiode 100 is connected to the FD portion 90 serving as the input node of the amplification transistor 130 via the transfer transistor 140. The photodiode 105 is connected to the FD portion 90 serving as the input node of the amplification transistor 130 via the transfer transistor 145. By such connection, the amplification transistor 130 of the pixel unit 280 outputs a signal based on an electric charge generated in the photodiode 100 and a signal based on an electric charge generated in the photodiode 105. Each of the transfer transistor 140 and the transfer transistor 145 is controlled to be in the conducting state (on state) or the non-conducting state (off state) by the control signal READ which is supplied from the vertical scanning circuit 170. Note that, a number added to an end of each reference sign indicates a number of each pixel row. Since the other constituents included in the pixel unit 280 are the same as those of the exemplary embodiment 1 or the exemplary embodiment 2, description thereof will be omitted.

The pixel unit 280 of the present exemplary embodiment has two connection transistors of the connection transistor 150 that performs connection in the pixel row direction and a connection transistor 155 that performs connection in the pixel column direction. The connection transistor 150 that performs connection in the pixel row direction is controlled to be in the conducting state (on state) or the non-conducting state (off state) by a control signal ADDh. The connection transistor 155 that performs connection in the pixel column direction is controlled to be in the conducting state (on state) or the non-conducting state (off state) by a control signal ADDv. Moreover, in the pixel row direction, one connection path for addition is formed for one pixel row. In a pixel row including the pixel unit 280, pixel units each of which includes an R pixel are connected to each other. In a pixel row including the pixel unit 288, pixel units each of which includes a B pixel are connected to each other.

The pixel unit 281 and the pixel unit 288 include the connection transistors 151 and 152, respectively. The transistors may not be used for addition of signals. The transistors are arranged in order to maintain uniformity of a pixel structure. The transistors may be omitted.

An operation of adding signals of a plurality of pixels will be described below. An example in which addition is performed in a pixel block having two rows and three columns will be described. Control signals ADDh(1) and (3) are set to be at the high level to thereby connect the pixel units 280, 282, and 284. Moreover, a control signal ADDv(1) is set to be at the high level to thereby connect pixel units 288, 290, and 292 to the pixel units 280, 282, and 284 via the connection transistors 155, 156, and 167, respectively. That is, sources of amplification transistors of the six pixel units 280, 282, 284, 288, 290, and 292 are in a state of being connected to each other. As described above, although there is no connection path in the pixel row direction between the pixel units 288, 290, and 292, the pixel units are connected to each other.

On the other hand, for a pixel unit that includes a Gr pixel and a B pixel, control signals ADDh(4) and (6) and the control signal ADDv(1) are set to be at the high level. Thereby, sources of amplification transistors are connected to each other between six pixel units 283, 285, 287, 291, 293, and 295.

In a manner described above, it is possible to perform addition in the pixel block including two rows and three columns. In order to perform such addition in a block, combinations of pixel units to be connected in the pixel row direction can be different between pixel rows. With such a configuration, only by forming one connection path for one pixel row, it is possible to perform addition in a block.

In a case where the connection transistor 150 that performs connection in the pixel row direction and the connection transistor 155 that performs connection in the pixel column direction are arranged as in the present exemplary embodiment, there is a possibility that the number of control lines becomes large. Thus, a back-illuminated imaging device whose degree of freedom of line is high is suitable. Specifically, with respect to a semiconductor substrate in which a photoelectric conversion unit such as a photodiode is arranged, a microlens for condensation of light is arranged on a first surface and a line, such as a control line, which is connected to a connection transistor is arranged on a second surface opposite to the first surface. Note that, the exemplary embodiments 1 to 5 are also able to be applied to a back-illuminated imaging device.

[Exemplary Embodiment 7]

Description has been given in each of the exemplary embodiments 1 to 5 for a configuration in which addition in the pixel row direction is performed or a configuration in which addition in the pixel column direction is performed. In addition to the configurations, addition or thinning-out in the column circuit 180 may be combined. With the configuration of any of the exemplary embodiments 1 to 5, it is possible to perform, as in the exemplary embodiment 6, signal addition in a block composed of a plurality of pixel rows and a plurality of pixel columns.

Moreover, in each of the exemplary embodiments 1 to 6, a configuration in which one, two, or four output lines are arranged for one pixel column has been described. The number of output lines arranged for one pixel column is not limited thereto. Further, description has been given by taking, as an example, a case where one or two photodiodes are arranged for one FD portion. However, the number of photodiodes that share one FD portion is not limited thereto. For example, four photodiodes may be connected to one FD portion.

[Exemplary Embodiment 8]

Figure 9:
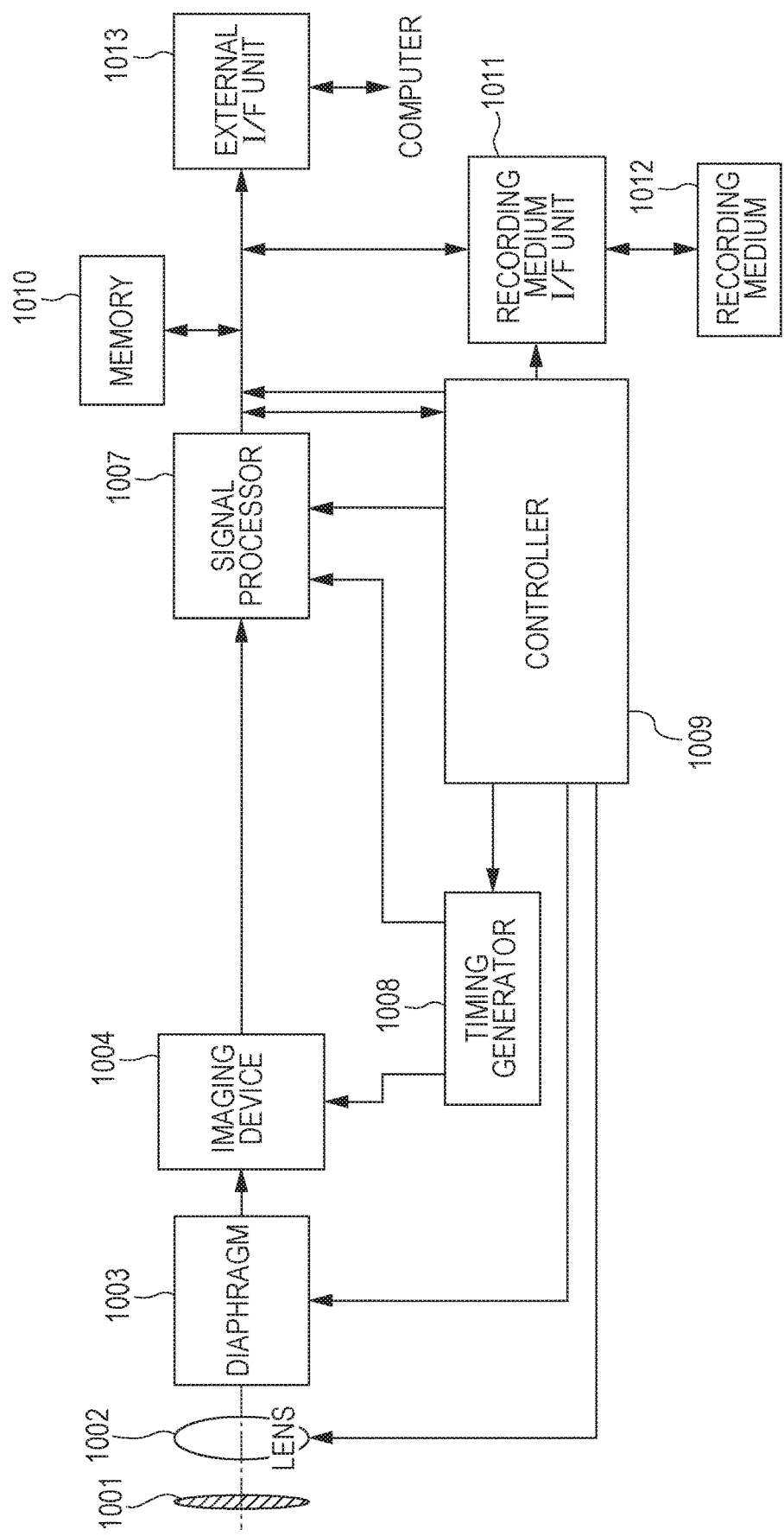
FIG. 9 is a block diagram of an exemplary embodiment of an imaging system.

An exemplary embodiment of an imaging system will be described. Examples of the imaging system include a digital still camera, a digital camcorder, a camera head, a copier, a facsimile, a mobile phone, an on-vehicle camera, an observation satellite, and the like. FIG. 9 illustrates a block diagram of a digital still camera as an example of the imaging system.

In FIG. 9, a barrier 1001 is used to protect a lens 1002. The lens 1002 is used to form an optical image of an object on an imaging device 1004. A diaphragm 1003 is used to adjust an amount of light passed through the lens 1002. The imaging device described in any of the aforementioned exemplary embodiments 1 to 6 is used as the imaging device 1004.

A signal processor 1007 is used to perform processing such as correction and data compression for a pixel signal output from the imaging device 1004 and acquire an image signal. In FIG. 9, a timing generator 1008 is used to output various timing signals to the imaging device 1004 and the signal processor 1007, and a controller 1009 is used to control the overall digital still camera. A memory 1010 that is a frame memory is used to temporally store image data. A recording medium I/F unit 1011 is used to perform recording in or reading from a recording medium. A recording medium 1012, such as a semiconductor memory, which is detachably mounted is used to record imaging data therein or read imaging data therefrom. An external I/F unit 1013 is used to communicate with an external computer or the like.

Note that, the imaging system is only required to have at least the imaging device 1004 and the signal processor 1007 that performs processing for a pixel signal output from the imaging device 1004. In that case, the other configurations are arranged outside the system.

As described above, in the exemplary embodiment of the imaging system, the imaging device of any of the exemplary embodiments 1 to 7 is used for the imaging device 1004. With such a configuration, in the imaging system, it is possible to suppress deterioration in image quality or improve a degree of freedom of a signal reading method.

[Exemplary Embodiment 9]

Figure 10A:
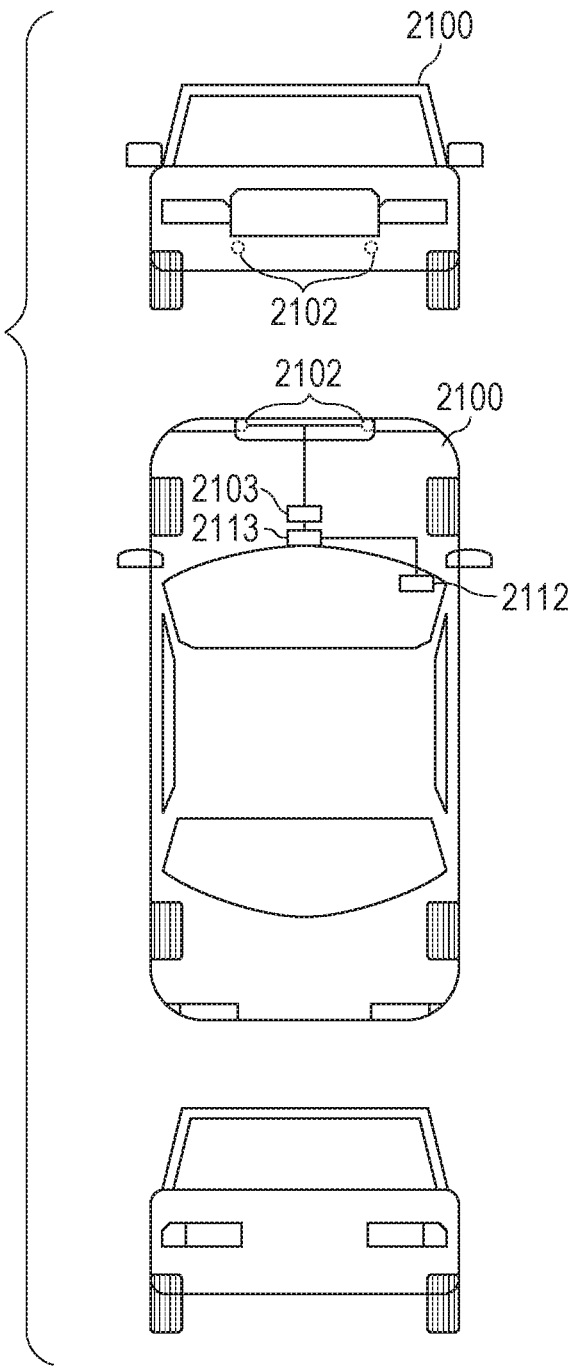
FIGS. 10A and 10B are diagrams of a main inner structure and a system configuration, respectively, of a moving body.

An exemplary embodiment of a moving body will be described. The moving body of the present exemplary embodiment is a motor vehicle that includes an on-vehicle camera. FIG. 10A schematically illustrates an external appearance and a main inner structure of a motor vehicle 2100. The motor vehicle 2100 includes imaging devices 2102, an integrated circuit (ASIC: application-specific integrated circuit) for an imaging system 2103, a warning device 2112, and a main control unit 2113.

For each of the imaging devices 2102, the imaging device described in any of the above-described exemplary embodiments is used. The warning device 2112 gives a warning to a driver when a signal that indicates an abnormality is received from an imaging system, a vehicle sensor, a control unit, or the like. The main control unit 2113 totally controls operations of the imaging system, the vehicle sensor, the control unit, and the like. Note that, the motor vehicle 2100 may not include the main control unit 2113. In this case, each of the imaging system, the vehicle sensor, and the control unit individually has a communication interface and performs transmission/reception of a control signal via a communication network (for example, CAN protocol).

Figure 10B:
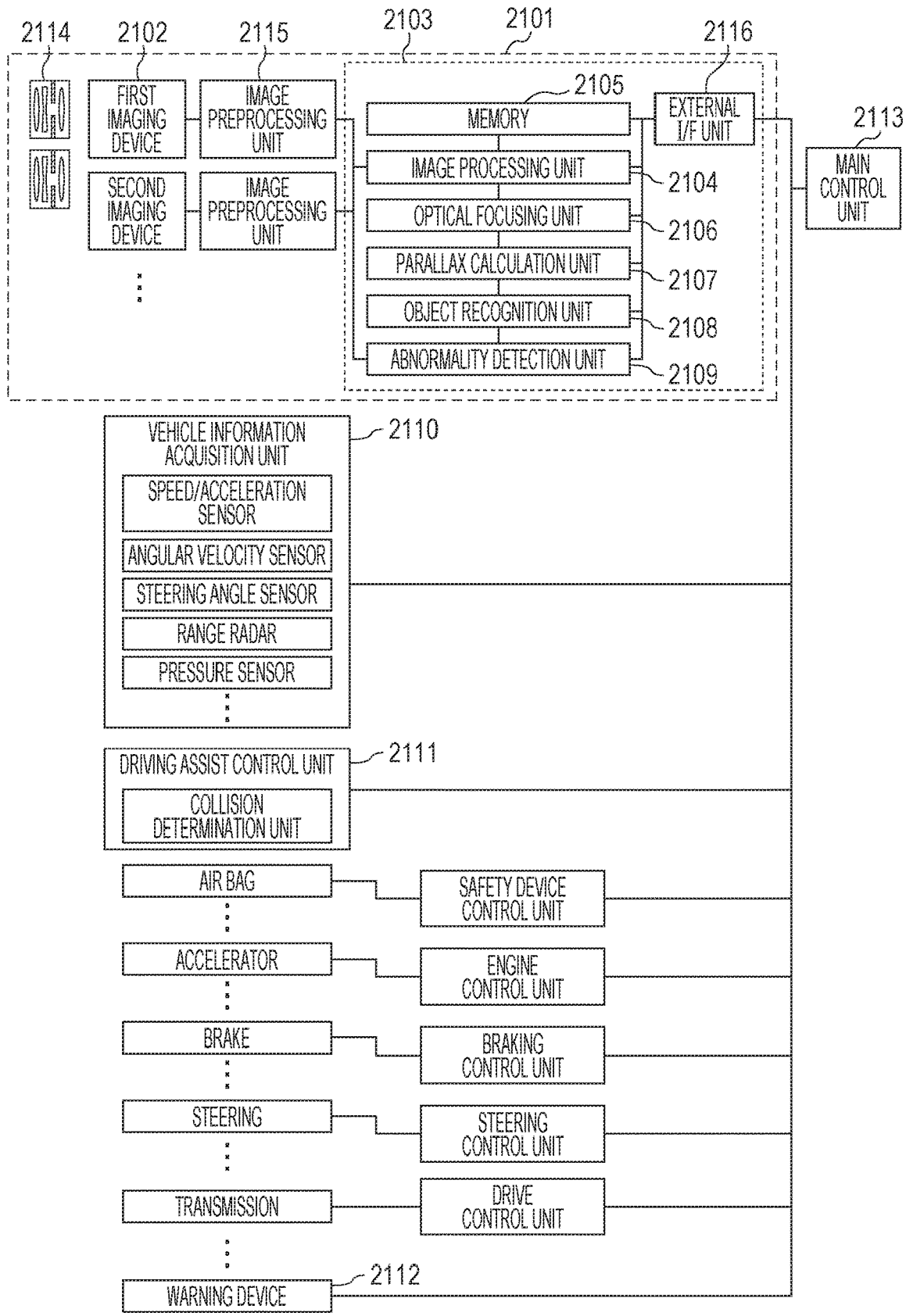

FIG. 10B is a block diagram illustrating a system configuration of the motor vehicle 2100. The motor vehicle 2100 includes a first imaging device 2102 and a second imaging device 2102. That is, the on-vehicle camera of the present exemplary embodiment is a stereocamera. Each of the imaging devices 2102 forms an object image by an optical unit 2114. A pixel signal output from the imaging device 2102 is subjected to processing by an image preprocessing unit 2115, and transferred to the integrated circuit for an imaging system 2103. The image preprocessing unit 2115 performs processing such as S-N calculation and synchronization signal addition.

The integrated circuit for an imaging system 2103 includes an image processing unit 2104, a memory 2105, an optical focusing unit 2106, a parallax calculation unit 2107, an object recognition unit 2108, an abnormality detection unit 2109, and an external interface (I/F) unit 2116. The image processing unit 2104 performs processing for a pixel signal to thereby generate an image signal. Moreover, the image processing unit 2104 corrects the image signal and complements an abnormal pixel. The memory 2105 temporarily holds the image signal. Moreover, the memory 2105 may store a position of an abnormal pixel of the imaging device 2102, which is known. The optical focusing unit 2106 focuses on an object or measures a distance of an object by using the image signal. The parallax calculation unit 2107 performs object comparison (stereo matching) of parallax images. The object recognition unit 2108 analyzes the image signal and recognizes an object such as a motor vehicle, a person, a sign, or a road. The abnormality detection unit 2109 detects a fault or a malfunction of the imaging device 2102. In a case of detecting a fault or a malfunction, the abnormality detection unit 2109 transmits, to the main control unit 2113, a signal indicating that an abnormality is detected. The external I/F unit 2116 relays exchange of information between each unit of the integrated circuit for an imaging system 2103 and the main control unit 2113, various control units, or the like.

The motor vehicle 2100 includes a vehicle information acquisition unit 2110 and a driving assist control unit 2111. The vehicle information acquisition unit 2110 includes a vehicle sensor such as a speed/acceleration sensor, an angular velocity sensor, a steering angle sensor, a range radar, a pressure sensor, and the like.

The driving assist control unit 2111 includes a collision determination unit. The collision determination unit determines, on the basis of information from the optical focusing unit 2106, the parallax calculation unit 2107, or the object recognition unit 2108, whether or not there is a possibility of collision with an object. The optical focusing unit 2106 and the parallax calculation unit 2107 are examples of a distance information acquisition unit configured to acquire distance information with respect to a target object. That is, distance information is information on parallax, a de-focusing amount, a distance to a target object, or the like. The collision determination unit may use any of such distance information to thereby determine a possibility of collision. The distance information acquisition unit may be realized by hardware that is exclusively designed, or may be realized by a software module.

An example in which the driving assist control unit 2111 controls the motor vehicle 2100 not to collide with another object has been described, but the disclosure is applicable also to control of automatic driving by following another vehicle, control of automatic driving for not driving out of a traffic lane, or the like.

The motor vehicle 2100 further includes units such as an air bag, an accelerator, a brake, a steering, and a transmission, which are used for driving. Moreover, the motor vehicle 2100 includes a control unit therefor. The control unit controls, on the basis of a control signal of the main control unit 2113, the corresponding drive unit.

Applications of the imaging system used as the present exemplary embodiment is not limited to an application to a motor vehicle, and the imaging system is applicable to a moving body (moving device) such as, for example, a vessel, an aircraft, or an industrial robot. In addition, the imaging system is applicable not only to a moving body but also to equipment such as intelligent transport systems (ITS), which widely uses object recognition.

As described above, in the exemplary embodiment of the motor vehicle, the imaging device of any of the exemplary embodiments 1 to 6 is used for the imaging device 2102. With such a configuration, in a moving body, it is possible to suppress deterioration in image quality or improve a degree of freedom of a signal reading method.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-031426 filed Feb. 22, 2017, which is hereby incorporated by reference herein in its entirety.

What is claimed is:

1. An imaging device comprising:
a plurality of pixels each of which includes:
a photoelectric conversion unit;
an amplification transistor that outputs a signal based on an electric charge generated in the photoelectric conversion unit;
a selection transistor that connects a source of the amplification transistor and an output line; and
a connection transistor that includes first and second nodes, a conducting state between the first and second nodes being controlled by a signal supplied to a gate of the connection transistor, wherein
the first node is connected to the source of the amplification transistor of a first pixel included in the plurality of pixels, and
the second node is connected to the source of the amplification transistor of a second pixel included in the plurality of pixels,
wherein the connection transistor is located in the first pixel.

2. The imaging device according to claim 1, wherein the source of the amplification transistor of the first pixel and the source of the amplification transistor of the second pixel are connected to a common output line via the corresponding selection transistors.

3. The imaging device according to claim 2, wherein the photoelectric conversion unit of a third pixel included in the plurality of pixels is arranged between the photoelectric conversion unit of the first pixel and the photoelectric conversion unit of the second pixel, and
the source of the amplification transistor of the third pixel is disconnected from the source of the amplification transistor of the first pixel and the source of the amplification transistor of the second pixel, in a case where the connection transistor is in an on state.

4. The imaging device according to claim 2, wherein in a case where a signal is output from each of the first pixel and the second pixel, the connection transistor is in an on state, the selection transistor of the first pixel is in the on state, and the selection transistor of the second pixel is in the on state.

5. The imaging device according to claim 1, further comprising a plurality of output lines that include a first output line and a second output line, wherein the source of the amplification transistor of the first pixel is connected to the first output line via the selection transistor of the first pixel, and the source of the amplification transistor of the second pixel is connected to the second output line via the selection transistor of the second pixel.

6. The imaging device according to claim 5, wherein the first pixel and the second pixel are included in one pixel column.

7. The imaging device according to claim 5, wherein the first pixel and a third pixel that is included in the plurality of pixels constitute a first pixel unit,
the amplification transistor of the first pixel outputs a signal based on an electric charge generated in the photoelectric conversion unit of the third pixel,
the second pixel and a fourth pixel that is included in the plurality of pixels constitute a second pixel unit,
the amplification transistor of the second pixel outputs a signal based on an electric charge generated in the photoelectric conversion unit of the fourth pixel, and
the first pixel, the second pixel, the third pixel, and the fourth pixel are included in one pixel column.

8. The imaging device according to claim 7, wherein the photoelectric conversion unit of the third pixel is arranged between the photoelectric conversion unit of the first pixel and the photoelectric conversion unit of the second pixel, and
the photoelectric conversion unit of the second pixel is arranged between the photoelectric conversion unit of the third pixel and the photoelectric conversion unit of the fourth pixel.

9. The imaging device according to claim 5, wherein the first pixel and the second pixel are included in one pixel row.

10. The imaging device according to claim 9, wherein the photoelectric conversion unit of a third pixel included in the plurality of pixels is arranged between the photoelectric conversion unit of the first pixel and the photoelectric conversion potion of the second pixel, and
the source of the amplification transistor of the third pixel is disconnected from the source of the amplification transistor of the first pixel and the source of the amplification transistor of the second pixel, in a case where the connection transistor is in an on state.

11. The imaging device according to claim 9, wherein a first control line that is connected to a gate of the selection transistor of the first pixel and a second control line that is connected to a gate of the selection transistor of the second pixel are electrically separated.

12. The imaging device according to claim 5, wherein in a case where a signal is output from each of the first pixel and the second pixel, the connection transistor is in an on state, the selection transistor of the first pixel is in the on state, and the selection transistor of the second pixel is in an off state.

13. The imaging device according to claim 1, wherein a threshold voltage of the connection transistor is lower than a threshold voltage of the selection transistor of the first pixel and a threshold voltage of the selection transistor of the second pixel.

14. The imaging device according to claim 1, further comprising a second connection transistor that connects the source of the amplification transistor of the first pixel and the source of the amplification transistor of a pixel that is included in the plurality of pixels and is different from the first pixel and the second pixel.

15. The imaging device according to claim 14, wherein in a case where a signal is output from each of the first pixel and the second pixel, the connection transistor is in an on state, and the second connection transistor is in an off state.

16. The imaging device according to claim 1, further comprising a line arranged between a line connected to the connection transistor and the output line.

17. The imaging device according to claim 1, wherein a color filter having a same color is arranged in each of the first pixel and the second pixel.

18. The imaging device according to claim 1, further comprising a current source that supplies a current to both the amplification transistor of the first pixel and the amplification transistor of the second pixel, wherein
in a case where the connection transistor is in an on state, part of the current supplied from the current source flows to the amplification transistor of the first pixel, and another part of the current supplied from the current source flows to the amplification transistor of the second pixel.

19. The imaging device according to claim 18, further comprising an analog-to-digital conversion circuit that performs analog-to-digital conversion on a signal that is output to the output line in a state where the connection transistor is in the on state.

20. The imaging device according to claim 19, wherein the amplification transistor of the first pixel or the amplification transistor of the second pixel and the current source constitute a source follower circuit.

21. The imaging device according to claim 20, wherein each of the plurality of pixels includes a transfer transistor that transfers an electric charge of the photoelectric conversion unit, and a reset transistor that resets a voltage of an input node of the amplification transistor, and
each of the first pixel and the second pixel outputs, in the state where the connection transistor is in the on state, a reset signal in which the voltage of the input node is reset by the reset transistor.

22. The imaging device according to claim 1, further comprising:
a semiconductor substrate in which the photoelectric conversion unit is arranged;
a lens arranged on a first surface of the semiconductor substrate; and
a control line that is connected to the connection transistor and arranged on a second surface of the semiconductor substrate, which is opposite to the first surface.

23. An imaging device comprising:
a plurality of pixels each of which includes a photoelectric conversion unit, an amplification transistor that outputs a signal based on an electric charge generated in the photoelectric conversion unit, a selection transistor that connects a source of the amplification transistor and an output line, and a connection transistor;
a first output line that is connected, via the selection transistor of a first pixel included in the plurality of pixels, to the source of the amplification transistor of the first pixel; and
a second output line that is connected, via the selection transistor of a second pixel included in the plurality of pixels, to the source of the amplification transistor of the second pixel,
wherein the connection transistor that connects the source of the amplification transistor of the first pixel and the source of the amplification transistor of the second pixel via a path that does not include the selection transistor of the first pixel and the selection transistor of the second pixel.

24. The imaging device according to claim 23, wherein the first pixel and a third pixel that is included in the plurality of pixels constitute a first pixel unit, the amplification transistor of the first pixel outputs a signal based on an electric charge generated in the photoelectric conversion unit of the third pixel, the second pixel and a fourth pixel that is included in the plurality of pixels constitute a second pixel unit, the amplification transistor of the second pixel outputs a signal based on an electric charge generated in the photoelectric conversion unit of the fourth pixel, and the first pixel, the second pixel, the third pixel, and the fourth pixel are included in one pixel column.

25. The imaging device according to claim 23, wherein in a case where a signal is output from each of the first pixel and the second pixel, the connection transistor is in an on state, the selection transistor of the first pixel is in the on state, and the selection transistor of the second pixel is in an off state.

26. The imaging device according to claim 23, wherein a threshold voltage of the connection transistor is lower than a threshold voltage of the selection transistor of the first pixel and a threshold voltage of the selection transistor of the second pixel.

27. The imaging device according to claim 23, further comprising a line arranged between a line connected to the connection transistor and the output line.

28. The imaging device according to claim 23, further comprising a current source that supplies a current to both the amplification transistor of the first pixel and the amplification transistor of the second pixel, wherein in a case where the connection transistor is in an on state, part of the current supplied from the current source flows to the amplification transistor of the first pixel, and another part of the current supplied from the current source flows to the amplification transistor of the second pixel.

29. An imaging device comprising:
a plurality of pixels each of which includes:
  a photoelectric conversion unit;
  an amplification transistor that outputs a signal based on an electric charge generated in the photoelectric conversion unit;
  a selection transistor that connects a source of the amplification transistor and an output line; and
  a connection transistor that, in a case where both the selection transistor of a first pixel included in the plurality of pixels and the selection transistor of a second pixel included in the plurality of pixels are in an on state, connects the source of the amplification transistor of the first pixel and the source of the amplification transistor of the second pixel via a first path in parallel to a second path including the selection transistor of the first pixel and the selection transistor of the second pixel,
wherein the connection transistor is located in the first pixel.

30. An imaging system comprising:
the imaging device according to claim 1; and
a processing device that performs processing for a signal output from the imaging device and acquires an image signal.

31. A moving body comprising:
the imaging device according to claim 1;
a processing device that performs processing for a signal output from the imaging device; and
a control unit configured to control the moving body on a basis of a result of the processing.

* * * * *